March 18, 1969

T. M. CRAIG 3,433,167

FLUID MACHINES

Filed Feb. 24, 1967

Inventor

THOMAS M. CRAIG

By
Mason, Fenwick & Lawrence
Attorneys

March 18, 1969 T. M. CRAIG 3,433,167

FLUID MACHINES

Filed Feb. 24, 1967 Sheet 3 of 5

Inventor
THOMAS M. CRAIG
Mason, Fenwick & Lawrence
By
Attorneys

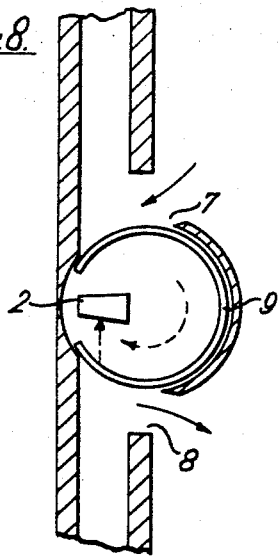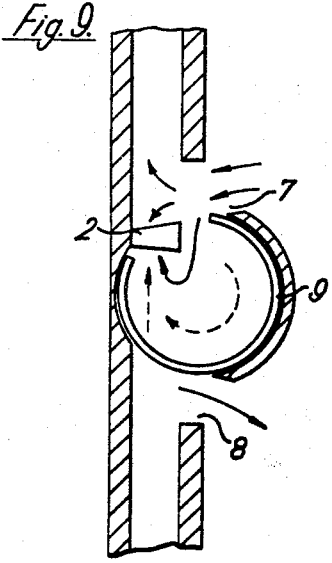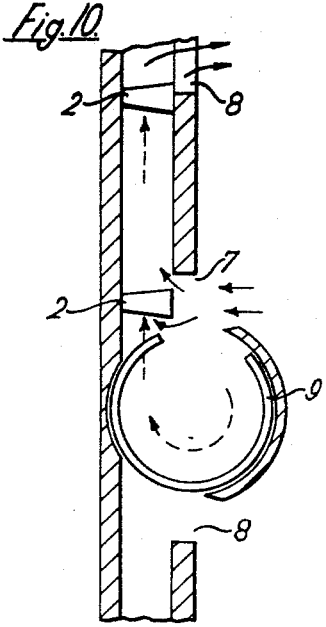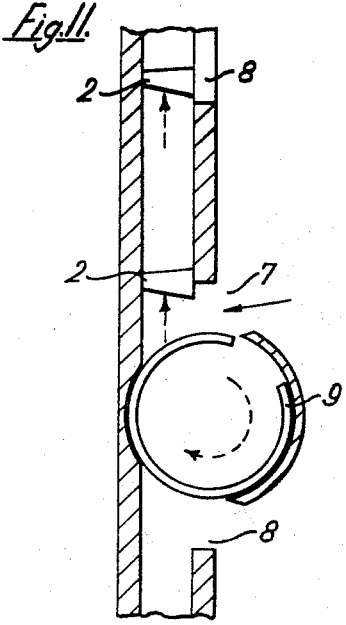
Inventor
THOMAS M. CRAIG

United States Patent Office 3,433,167
Patented Mar. 18, 1969

3,433,167
FLUID MACHINES
Thomas Moodie Craig, Garelochhead, Scotland
(2518 Wildwood Road, Wildwood, Pa. 15091)
Filed Feb. 24, 1967, Ser. No. 618,412
Claims priority, application Great Britain, Feb. 24, 1966,
8,112/66
U.S. Cl. 103—125                                    4 Claims
Int. Cl. F04c *1/16, 3/00*

ABSTRACT OF THE DISCLOSURE

A fluid machine including a first member formed by a spherical segment and having at least one vane outstanding therefrom, the member being rotatable such that the vane sweeps a passage defined in the casing, the ends of said passage being defined by a second member rotatable in phase with the first member about an axis perpendicular to the axis of rotation of the first member, said second member having an opening therein to permit the through passage of the vane, and the casing being provided with inlet and outlet ports in communication with the passage.

---

This invention relates to improvements in or relating to fluid machines.

According to the present invention there is provided a fluid machine including a first member, a casing for the first member, the first member and casing being capable of relative rotation about a first axis, the casing together with the first member defining an enclosed passage around part of the periphery of the first member, a vane or vanes attached to one of the first member and the casing and adapted to sweep the passage, ports to permit admission and exhaust of fluid to and from said passage, and at least one second member, capable of rotation about a second axis perpendicular to the first axis and arranged to define ends of said passage and extend over part of the periphery of the first member, an aperture or apertures being provided in the or each second member and means being provided to rotate the or each second member in phase with the rotating one of first member and the casing whereby the vane or vanes are permitted to pass from one side of the or each second member to the other.

Further according to the present invention there is provided a pump, including a rotor adapted to be rotatably driven about a first axis and provided with at least one vane outstanding from its periphery, a casing for the rotor, the casing defining an enclosed passage around part of the periphery of the rotor for the vane or vanes, ports to permit admission and exhaust of fluid to and from said passage, and at least one second member capable of rotation about a second axis perpendicular to the first axis and arranged to define ends of said passage and extend over part of the periphery of the rotor, an aperture or apertures being provided in the or each second member and means being provided to rotate the or each second member in phase with the rotor whereby the vane or vanes of the rotor are permitted to pass from one side of the or each second member to the other, fluid thus being pumped.

The present invention provides also a fluid motor, including a rotor rotatable about a first axis and provided with at least one vane outstanding from its periphery, a casing for the rotor, the casing defining an enclosed passage around part of the periphery of the rotor for the vane, or vanes, ports to permit admission and exhaust of pressure fluid to and from said passage, and at least one second member capable of rotation about a second axis perpendicular to the first axis and arranged to define ends of said passage and extend over part of the periphery of the rotor, an aperture or apertures being provided in the or each second member and means being provided to rotate the, or each, second member in phase with the rotor whereby the vane or vanes of the rotor are permitted to pass from one side of the or each second member to the other, work thus being done.

Embodiments of the present invention will now be described, by way of example, with reference to the accompanying drawings, in which:

FIGS. 6 to 11 show a diagrammatic plan of the fluid machine of FIG. 4 and FIG. 5 in progressively different stages of operation.

Figure 1:
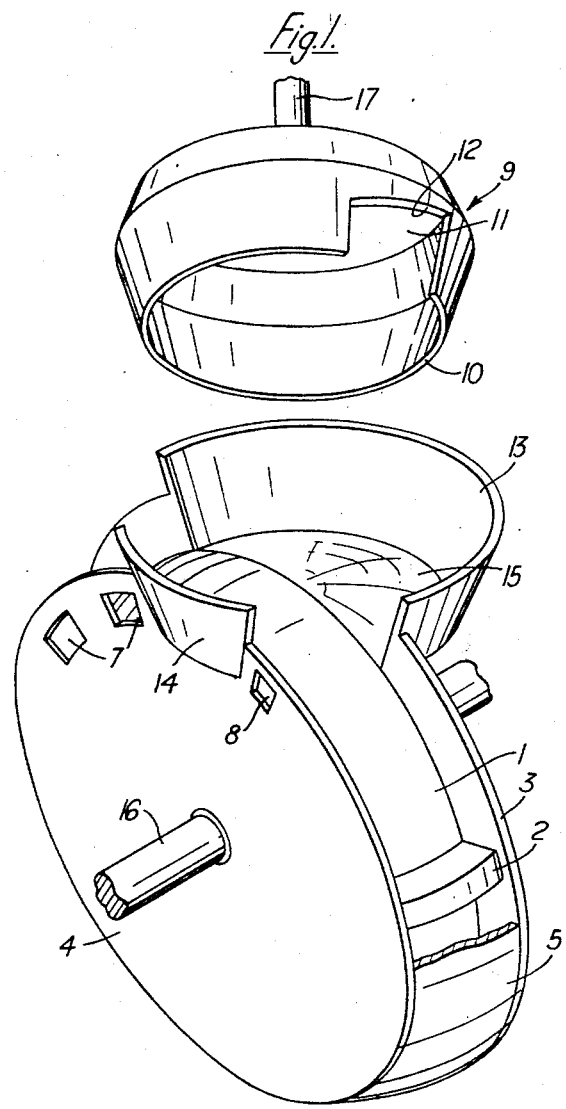
FIG. 1 shows an exploded perspective view of simple form of fluid machine.

FIG. 1 shows a simple form of a fluid machine which can function either as a compressor, or as an expander. The machine includes a first member or rotor 1 capable of rotation, this member being a spherical segment, situated wholly in one hemisphere, the axis of which hemisphere is concentric with the axis of rotation. A vane 2 is provided outstanding radially from the periphery, or zone, of the rotor 1, and a stationary casing including a major side casing 3, a minor side casing 4 and a peripheral casing 5, part of which is cut away in FIG. 1 for clarity, together with the periphery of the rotor 1 defines an enclosed passage 6 over approximately 270° of the periphery of the rotor 1, the passage 6 having a series of inlet ports 7 and an outlet port 8 through the minor side casing 4.

A second member of rotary abutment 9, capable of rotating in phase with the rotor 1 about a second axis perpendicular to the axis of rotation of the rotor is arranged to define the ends of the passage 6 and extends over that part of the periphery of the rotor 1 not covered by the passage. The rotary abutment 9 is a truncated cone the apex of which is adjacent the rotor, and its face 10 facing the rotor 1 is spherically concave, the curvature of the sphere being substantially the same as the curvature of the zone of the rotor. An aperture 11 of substantially the same shape as the vane 2 is cut in the side of the rotary abutment 9 and extends into the rotary abutment such that when the rotor and rotary abutment are rotating in phase the vane 2 may pass from one side of the second member to the other, and the vane 2 is profiled such that as it enters the aperture one edge 12 of the aperture wipes the leading face of the vane. This vane profile is derived from the equation $$y = R\left(1 - \frac{\sin^2 \phi}{4}\right)^{1/2} \cdot \left(\sin 30° - \frac{\phi}{3}\right) - \frac{R}{2}\cos\phi$$

where:

$y$ = the displacement backwards from a straight line drawn across the periphery of the rotor from the front major side of the blade.

$R$ = radius from centre of the sphere between the rotor periphery and top of the blade.

φ=rotation of rotary abutment. φ=0 when leading edge of major side of blade contacts rotary abutment.)

(for a conical angle of the rotary abutment of 60°)

Extensions 13, 14 of the major and minor side casings respectively surround the side of the rotary abutment 9 and another extension 15 supports that part of the concave face 10 of the rotary abutment not extending over the rotor 1.

Valve means (not shown) are provided for the outlet ports 8 phased to operate when the rotor 1 reaches a predetermined position.

In operation as a gas compressor the rotor 1 is driven by some external means through shaft 16 and by employing a system of gears (not shown) between the rotor 1 and the shaft 17 of the rotary abutment, said rotary abutment rotates in phase with the rotor.

Figure 2:
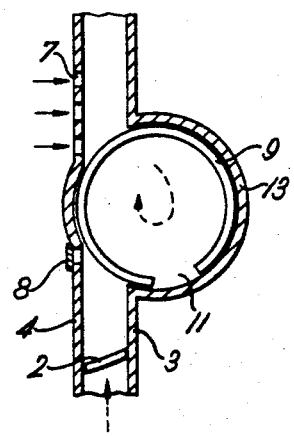
FIG. 2 shows a diagrammatic plan of the machine of FIG. 1.
Figure 3:
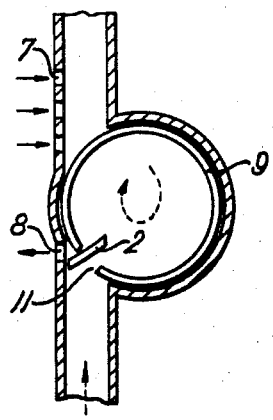
FIG. 3 is a plan similar to FIG. 2, showing the machine at a different stage of operation.

When the blade 2 has just passed through the rotary abutment it passes the inlet ports 8 in the casing 4 and induces a charge of gas into the passage 6 behind the blade 2. A charge induced during the previous revolution is in front of the vane 2 and, as the rotor 1 rotates, the gas is compressed between the sides 3, 4 and top 5 of the casing and the side of the rotary abutment closing the end of the passage 6 (see FIG. 2). As rotation progresses so will the pressure of the gas increase until the forward edge of the leading face of the vane 2 approaches the rotary abutment. At this moment the aperture 11 in the wall of the rotary abutment appears, its edge 12 wipes across the leading face of the vane and, as the vane is shaped along the locus traced on the zone of the rotor 1 by the edge 12 of the aperture 11, the gas is finally compressed down into a pocket defined by the side of the rotary abutment, the casing 4 and the part of the vane 2 which has not penetrated into the aperture. The compressed gas is then exhausted through the outlet port 8 (FIG. 3) which opens at this point.

Continued rotation results in the vane penetrating completely into the rotary abutment and, by the geometry of the moving parts, when the blade has travelled to the other side of the rotary abutment the aperture 11 has rotated to a suitable position to allow the vane to emerge. The vane then proceeds with the compression until after the inlet ports 7 have been passed when fresh compression begins and a new charge is induced behind the vane by the partial vacuum created between the rear face of the vane, the sides 3, 4 and top 5 of the casing and the rotating side of the rotary abutment.

The above described operating sequence illustrates the use of the fluid machine as a compressor, the machine, however, can be utilised equally well as an expander, in which case the sequence is reversed and compressed fluid admitted to the passage through the port 8 forces the rotor 1 to rotate. When functioning as an expander the rotor is preferably provided with two diametrically opposed vanes 12, the gearing being altered such that the rotary abutment rotates at twice the speed of the rotor.

In one modification of the above described embodiment the rotary abutment is substantially cylindrical.

A further embodiment of the invention will now be described with reference to FIGS. 4 to 11 of the accompanying drawings. In the description of this embodiment parts similar to those described in the above embodiment will, for the sake of clarity, be allocated the same reference numerals.

In this embodiment the machine is functioning as a hydraulic motor, that is, it is converting the pressure energy of fluid supplied to it into mechanical work. The rotor 1 is, in this instance provided with three flat faced blades 2, spaced 120° apart from each other and rigidly fixed to the rotor 1 by dovetails 20 and two rotary abutments 9 are provided, spaced diametrally.

Each rotary abutment 9 is a hollow truncated 60° cone and is mounted within the major and minor side casings 3 and 4 such that its axis is perpendicular to the axis of rotation of the rotor 1.

Each rotary abutment is supported in position on a post 21 which is basically a solid truncated cone fitted inside the rotary abutment 9. It is attached by two long studs (not shown in the drawings) to the major side casing 3 and supports a stub shaft 22 in two spaced bearings 23, the axis of the shaft 22 being parallel to the axis of the cone of the rotary abutment. The inner end of the stub shaft 22 is provided with a spiral bevel pinion 24 which meshes with a gear wheel 25 fixed to the rotor 1. The outer end of the shaft carries a spur wheel 26 which engages an internal gear 27 attached to the rotary abutment 9. The ratios of the gears 24–27 are chosen that there is a 1–3 step up between the rotor and the rotary abutment.

A cover plate 28, attached to the casing by a plurality of studs 31 spaced around the periphery of the plate, encloses the rotary abutment and a stud 29 threaded in the cover plate gives rigidity to the post 21. A spacer 32 located around the stud abuts the post and the plate and is maintained in compression. A spherical seating 15 offers the necessary spherical boundary conditions for that part of the rotary abutment 9 not in contact with the rotor 1.

A peripheral casing 5 is bolted between the major and the minor side casing 3 and 4 and has a concave spherical inner surface defining the top of passage 6. The shaft 16 to which the rotor 1 is keyed is mounted in bearings 30 in the casings 3 and 4.

Figure 6:
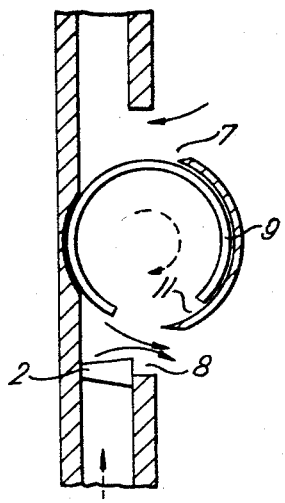

FIGS. 6 to 11 diagrammatically illustrate the operation of the machine as a hydraulic motor. In FIG. 6 a blade 2 has almost reached the rotary abutment 9 which has rotated such that the aperture 11 in its side is in such a position that on continued rotation the blade will enter the abutment. In this condition fluid is exhausting from port 8 while a further supply of pressure fluid is introduced into passage 6 behind the next blade through port 7 from, for example a pump, the pressure acting on the back of this next blade causing rotation.

Figure 7:
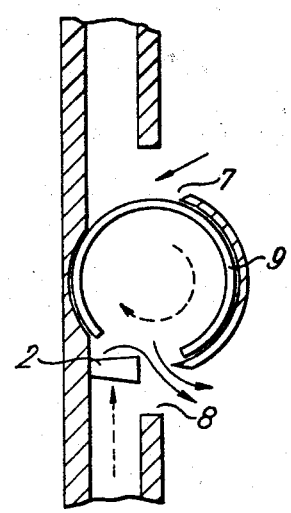
Figure 4:
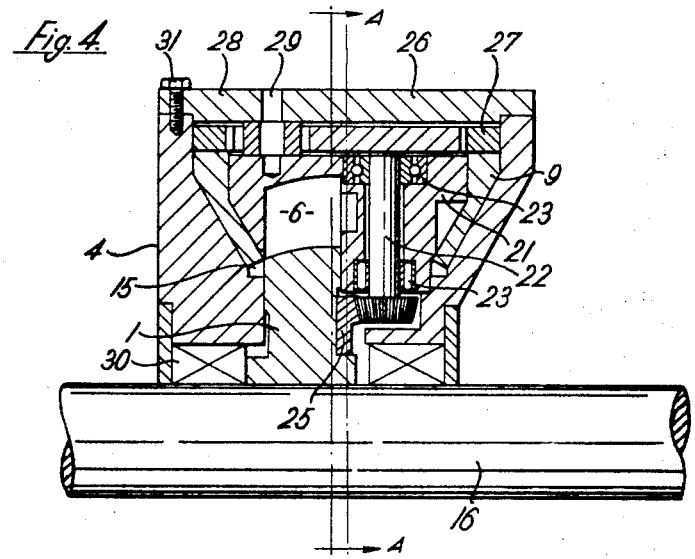
FIG. 4 shows a half sectional elevation through the line BB of FIG. 5, of a fluid machine.
Figure 5:
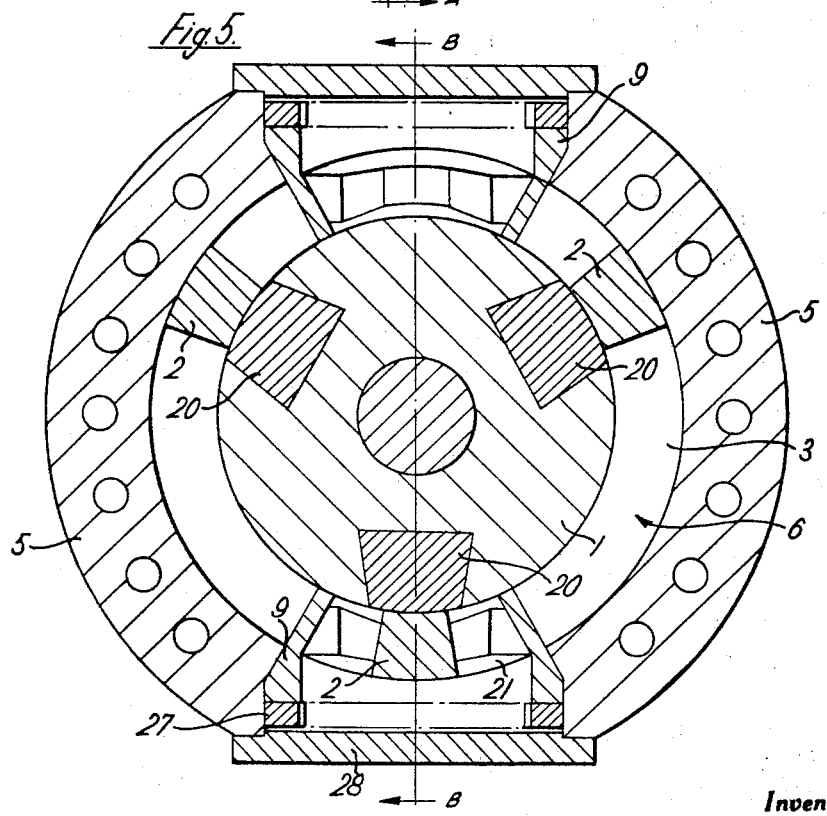
FIG. 5 shows a sectional elevation on the line AA of the fluid machine of FIG. 4.

In FIG. 7 the blade 2 is just entering the rotary abutment 9 with fluid still being exhausted through 8 while in FIG. 8 the blade is in mid-position with no fluid pressure acting on it.

In FIG. 9 the blade is shown emerging from the rotary abutment with fluid under pressure acting on both the forward and rear face of the blade. No work from the blade is being delivered, however, the preceding blade is still having the full fluid pressure exerted on it, with the internal rear face of the rotary abutment being the boundary against which the pressure reacts.

FIG. 10 shows that the preceding blade has reached the next outlet port 8. Pressure fluid is acting on both faces of the blade which has just passed through the rotary abutment, however, pressure on the back face of the preceding blade continues to cause rotation and work will be done.

It can be seen, therefore, that a constant output torque will be realised as one blade takes over from the preceding one.

In FIG. 11 the aperture 11 in the rotary abutment 9 is almost covered and pressure is applied behind blade 2 while the fluid in front of the blade is exhausting.

It can thus be appreciated that two of the three blades are always performing work.

In the embodiment described immediately above the machine functions as a hydraulic motor; by completely reversing the sequence of operations it can operate as a pump.

The motor described has a high torque to weight ratio, delivers maximum torque from the start up to full speed, has a torque output which does not fluctuate, is readily reversible, has a high speed partially due to the fact that valves, cams, cranks, sliding vanes are not required, and is relatively cheap to manufacture.

Figure 13:
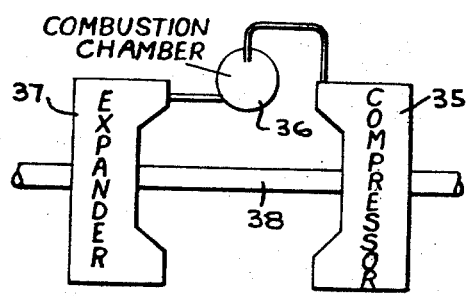
FIG. 13 illustrates still another environmental embodiment of the invention.

In another embodiment of the present invention two fluid machines as described above are interconnected to serve as a compressor and an expander, or motor, respectively shown in FIG. 13.

A supply of combustion mixture is initially compressed by the first machine 35 and is then led from the outlet port of that machine to a combustion chamber 36, the combustion chamber 36 being substantially spheroidal in shape. The inlet to the combustion chamber is arranged to be tangential to the spheroid thus giving the mixture a "swirl." The outlet from the chamber is at right angles to the inlet and exhausts radially into the inlet ports of an expander machine 37, the gaseous exhaust thereafter expanding and causing the first member to rotate.

In this embodiment of the first member of the compressor and the first member of the expander are mounted on a common shaft 38 such that the first member of the compressor is driven by the expander, the expander providing also rotary power.

Although the above embodiments have described fluid machines in which the operating medium is a gas or a liquid, it should be realised that the machines would function also with a vapour, for example, steam as the operating fluid.

Figure 12:
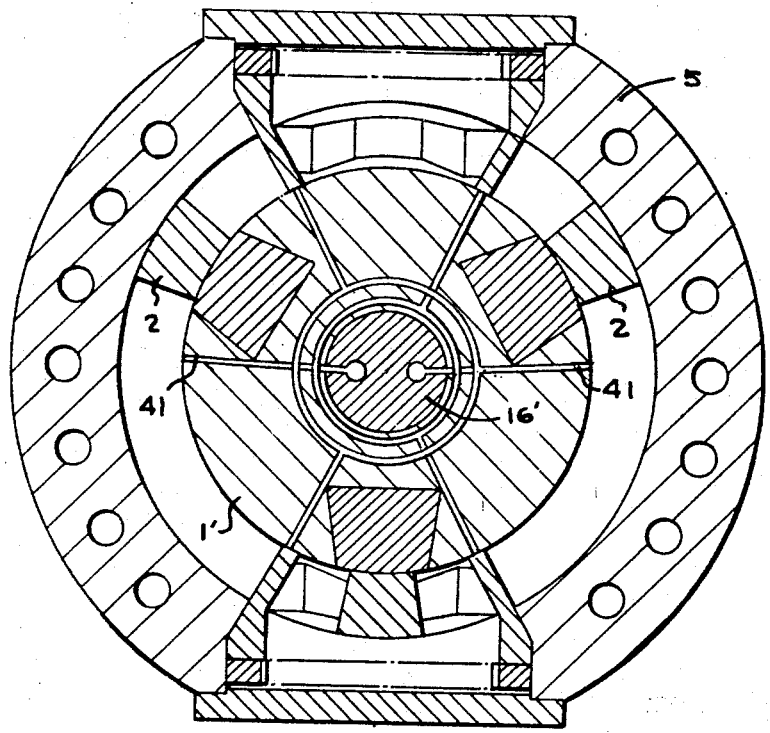
FIG. 12 illustrates an alternate embodiment.

In the above described embodiments the fluid machine has a fixed casing and a rotatable rotor. It is possible to fix the rotor and rotate the casing. In one example of this arrangement shown in FIG. 12, the machine is constructed as described above with modified inlet and outlet ports. The shaft 16 and rotor 1' remain stationary while the casing and rotary abutments rotate about the shaft axis. The shaft is provided with two passages 41 therein one of which leads into the rotor and branches into ducts leading to the forward side of the vanes, the other of which branches into ducts leading to the near side of the vanes. In this example, to give an even torque, there are as many rotary abutments as there are vanes. In another example of the arrangement the blades are mounted on the casing and project into the passage. In this case the rotary abutments are mounted on the stationary rotor. The base of the rotary abutments therefore slide on the peripheral casing and are provided with the aperture. The peripheral casing rotates while the major and minor side casings are stationary, the former being provided with inlet and outlet ports.

The machines described above are particularly suited to use in hydrostatic transmissions where, by mounting two, or more, machines of similar or different capacities on a common shaft, provision is made to change the overall capacity of the arrangement by lifting one, or more, of the rotary abutments and suitably blanking off the corresponding exhausts and inlets. By adjusting the rate of flow with a variable displacement pump or rotor in conjunction with changing the overall capacity a stepless speed or torque output can be obtained.

The machines described can be adapted to function as a hydraulic motor or pump, a gas compressor and motor, or a vapour, or steam, motor.

I claim:
1. A fluid machine including a first member in the form of a spherical segment, a casing for the first member, the first member and casing being capable of relative rotation about a first axis, the casing together with the first member defining an enclosed passage around part of the periphery of the first member, a vane or vanes attached to one of the first member and the casing and adapted to sweep the passage, ports to permit admission and exhaust of fluid to and from said passage, and at least one second member, capable of rotation about a second axis perpendicular to the first axis and arranged to define ends of said passage and extend over part of the periphery of the first member, an aperture or apertures being provided in the or each second member and means being provided to rotate the or each second member in phase with the rotating one of the first member and the casing whereby the vane or vanes are permitted to pass from one side of the or each second member to the other, the leading face of the or each vane being determined by the locus, traced on the peripheral surface of the first member by a point on the periphery of the second member as the first and second members rotate in phase.

2. A fluid machine as claimed in claim 1, in which the spherical segment is offset from the centre of the sphere of which it forms a part and the second axis is offset from the major diameter of the spherical segment.

3. A fluid machine as claimed in claim 1, in which the face of the second member facing the first member is spherically concave, the curvature of the sphere being substantially equal to the curvature of the zone of the spherical segment.

4. An arrangement including two fluid machines as claimed in claim 1, in which one machine acts as a compressor and the other as an expander, and in which the first members are mounted on a common shaft, the outlet ports of the compressor are connected with the inlet ports of the expander and a spherical combustion chamber having an outlet arranged substantially perpendicular to the inlet is interposed in said connection, such that a combustion mixture fed to the arrangement is compressed in the compressor, is ignited in the combustion chamber and drives the expander.

References Cited

UNITED STATES PATENTS

| 649,122 | 5/1900 | Allen | 230—150 |
| 1,060,039 | 4/1913 | Tygard. | |
| 1,332,468 | 3/1920 | Henig et al. | |
| 1,704,254 | 3/1929 | Jaffe. | |
| 3,277,832 | 10/1966 | Panie-Dujac | 103—125 |

FOREIGN PATENTS

| 1,954 | 1877 | Great Britain. |
| 2,525 | 1905 | Great Britain. |

DONLEY J. STOCKING, *Primary Examiner.*

WILBUR J. GOODLIN, *Assistant Examiner.*